(12) United States Patent
Kwon et al.

(10) Patent No.: US 7,760,002 B2
(45) Date of Patent: Jul. 20, 2010

(54) CLOCK GENERATING CIRCUIT AND CLOCK GENERATING METHOD THEREOF

(75) Inventors: Dae-Han Kwon, Gyeonggi-do (KR); Taek-Sang Song, Gyeonggi-do (KR)

(73) Assignee: Hynix Semiconductor, Inc., Gyeonggi-do (KR)

(*) Notice: Subject to any disclaimer, the term of this patent is extended or adjusted under 35 U.S.C. 154(b) by 22 days.

(21) Appl. No.: 12/325,346

(22) Filed: Dec. 1, 2008

(65) Prior Publication Data

US 2009/0322399 A1 Dec. 31, 2009

(30) Foreign Application Priority Data

Jun. 30, 2008 (KR) .................. 10-2008-0063174

(51) Int. Cl.
*G06F 1/06* (2006.01)
(52) U.S. Cl. .................. 327/295; 327/291; 327/296; 327/172
(58) Field of Classification Search .................. None
See application file for complete search history.

(56) References Cited

U.S. PATENT DOCUMENTS 6,009,134 A * 12/1999 Yoon .................. 375/376

| | | | |
|---|---|---|---|
| 6,442,225 B1 | 8/2002 | Huang et al. | |
| 6,597,235 B2 | 7/2003 | Choi et al. | |
| 6,859,079 B2 | 2/2005 | Haraguchi et al. | |
| 7,554,373 B2 * | 6/2009 | Fujino et al. .................. | 327/175 |

FOREIGN PATENT DOCUMENTS

| | | |
|---|---|---|
| JP | 2001-318731 | 11/2001 |
| KR | 102000007745 A | 12/2000 |
| KR | 102004002664 A | 3/2004 |
| KR | 102004003498 A | 4/2004 |

OTHER PUBLICATIONS

Notice of Allowance issued from Korean Intellectual Property Office on May 31, 2010.

* cited by examiner

*Primary Examiner*—An T Luu
(74) *Attorney, Agent, or Firm*—IP & T Law Firm PLC

(57) ABSTRACT

A clock generating circuit, including a pulse generating unit to generate a plurality of pulse signals based on a reference clock, the pulse signals each having the same period, a phase difference between the adjacent pulse signals being a first phase difference; and a multi-phase clock generating unit to generate a plurality of multi-phase clocks, a phase difference between the adjacent multi-phase clocks being equal to a second phase difference between pulse signals of a pulse signal pair, based on a plurality of unit-phase clock generating units receiving the pulse signal pairs.

19 Claims, 5 Drawing Sheets

CLOCK GENERATING CIRCUIT AND CLOCK GENERATING METHOD THEREOF

CROSS-REFERENCE TO RELATED APPLICATION

The present invention claims priority of Korean patent application number 10-2008-0063174, filed on Jun. 30, 2008 which is incorporated by reference in its entirety.

BACKGROUND OF THE INVENTION

The present invention relates to a clock generating circuit and a clock generating method thereof, and more particularly, to a clock generating circuit for dividing a clock to generate multi-phase clocks, and a clock generating method thereof.

Recently, semiconductor devices have begun to use multi-phase clocks in order to obtain high-speed operation. For example, a semiconductor device may use four reference clocks having 90-degree phase difference to generate four pulses having pulse widths corresponding to the phase difference of each clock. In this way, the semiconductor device can perform high-speed operation at four times the frequency of the reference clock. A phase locked loop circuit has been used to generate multi-phase clocks.

FIG. 1 illustrates a typical phase locked loop circuit that generates multi-phase clocks.

Referring to FIG. 1, the phase locked loop circuit includes a phase detector 101, a charge pump 103, a loop filter 105, a voltage controlled oscillator 107, and a divider 109.

The phase detector 101 compares a phase of a reference clock CLK with a phase of a divided clock CLK_DIV outputted from the divider 109. The phase detector 101 outputs an up signal UP when the phase of the reference clock CLK leads the phase of the divided clock CLK_DIV, and outputs a down signal DN when the phase of the reference clock CLK lags behind the phase of the divided clock CLK_DIV.

The charge pump 103 converts the up signal UP and the down signal DN into a voltage signal and outputs the voltage signal to the loop filter 105.

The loop filter 105 filters high-frequency components from the output signal of the charge pump 103 and outputs a control voltage VCTRL.

The voltage controlled oscillator 107 includes a ring-oscillator structure of delay cells 111, 113, 115 and 117. That is, the delay cells 111, 113, 115, and 117 are connected in cascade, and an output signal of the final delay cell 117 is inputted to the first delay cell 111. The output signals of the rest delay cells are inputted to their next delay cells, respectively. The delay amount of the delay cells 111, 113, 115 and 117 is controlled according to the control voltage VCTRL.

The number and phase difference of the multi-phase clocks are determined by the number and delay amount of the delay cells 111, 113, 115, and 117. For example, if the voltage controlled oscillator 107 is configured with two delay cells, four multi-phase clocks having 90-degree phase difference are generated. If the voltage controlled oscillator 107 is configured with four delay cells 111, 113, 115 and 117 as illustrated in FIG. 1, eight multi-phase clocks having 45-degree phase difference are generated.

The divider 109 divides the frequency of the multi-phase clocks CLKP1 to CLKP8, as represented by the clock signal CLKP4, to output the divided clock CLK_DIV. The divider 109 generates a low frequency clock by dividing the high frequency clock, a phase difference comparison of which is difficult, at a proper division ratio.

Since the phase locked loop circuit occupies a large area, the layout area of the semiconductor device including the phase locked loop circuit is increased, leading to an increase in power consumption. Furthermore, since the phase difference of the multi-phase clocks is determined by the delay amount of the delay cells, the phase difference of the multi-phase clocks will be varied if the delay amount of each delay cell is differently changed due to the influence of external noise or the like.

SUMMARY OF THE INVENTION

Embodiments of the present invention are directed to providing a clock generation circuit, which occupies a small area, has low power consumption, and generates multi-phase clocks having constant phase difference, and a clock generating method thereof.

In accordance with an aspect of the present invention, there is provided a clock generating circuit, which includes a pulse generator configured to generate a plurality of pulse signals, based on a reference clock, the pulse signals having the same period, a phase difference between the adjacent pulse signals being a first phase difference; and a multi-phase clock generator configured to generate a plurality of multi-phase clocks, a phase difference between the adjacent clocks being equal to a phase difference between pulse signal pairs, based on a plurality of unit-phase clock generator receiving pulse signal pairs constituted by pulse signals having a second phase difference.

In accordance with an another aspect of the present invention, there is provided a clock generating circuit, which includes a pulse generator configured to generate a plurality of pulse signals which are enabled in response to edges of a reference clock and have a first phase difference at equal intervals; and a multi-phase clock generator configured to generate a first multi-phase clock, which is enabled in response to a pulse signal having a leading phase in a plurality of pulse signal pairs having a second phase difference among a plurality of pulse signals and is disabled in response to a pulse signal having a lagging phase, and a second multi-phase clock, which is enabled in response to the pulse signal having the lagging phase and is disabled in response to the pulse signal having the leading phase.

In accordance with an another aspect of the present invention, there is provided a clock generating method, which includes generating a plurality of pulse signals, based on a reference clock, the pulse signals having the same period, a phase difference between the adjacent pulse signals being a first phase difference combining the pulse signals having a second phase difference into pulse signal pairs; and generating a plurality of multi-phase clocks, a phase difference between the adjacent clocks being equal to a phase difference between pulse signal pairs, based on the pulse signal pairs.

DESCRIPTION OF SPECIFIC EMBODIMENTS

Other objects and advantages of the present invention can be understood by the following description, and become apparent with reference to the embodiments of the present invention.

Figure 2:
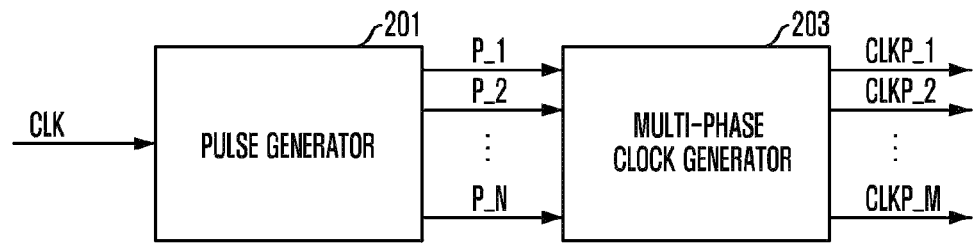
FIG. 2 illustrates a clock generating circuit in accordance with an embodiment of the present invention.

FIG. 2 illustrates a clock generating circuit in accordance with an embodiment of the present invention.

Referring to FIG. 2, the clock generating circuit in accordance with the embodiment of the present invention includes a pulse generator 201 and a multi-phase clock generator 203. The pulse generator 201 generates a plurality of pulse signals P_1 to P_N having the same period, based on a reference clock CLK. A phase difference between adjacent ones of the pulse signals P_1 to P_N is a first phase difference. The multi-phase clock generator 203 generates multi-phase clocks CLKP_1 to CLKP_M, based on the pulse signals P_1 to P_N. A phase difference between adjacent ones of the multi-phase clocks CLKP_1 to CLKP_M is equal to a phase difference between the pulse signals of a pulse signal pair among the pulse signals P_1 to P_N. The phase difference of the pulse signals constituting the pulse signal pair is a second phase difference.

Edges of the pulse signals P_1 to P_N generated by the pulse generator 201 are aligned at rising or falling edges of the reference clock CLK. The reference clock CLK is a clock that is a reference for the multi-phase clocks CLKP_1 to CLKP_M. The pulse signals P_1 to P_N are enabled to a high level in response to the rising or falling edges of the reference clock CLK, and the pulse signals P_1 and P_N have the same period.

For example, when assuming that six pulse signals P_1 to P_6 are enabled to a high level in response to the rising edges of the reference clock CLK, the six pulse signals P_1 to P_6 have six times the period of the reference clock CLK. The phase difference of the six pulse signals P_1 to P_N, that is, the first phase difference, is 60 degrees. When assuming that eight pulse signals P_1 to P_8 are enabled to a high level in response to the rising and falling edges of the reference clock CLK, the eight pulse signals P_1 to P_8 have four times the period of the reference clock CLK. The first phase difference of the eight pulse signals P_1 to P_8, is 45 degrees.

Figure 1:
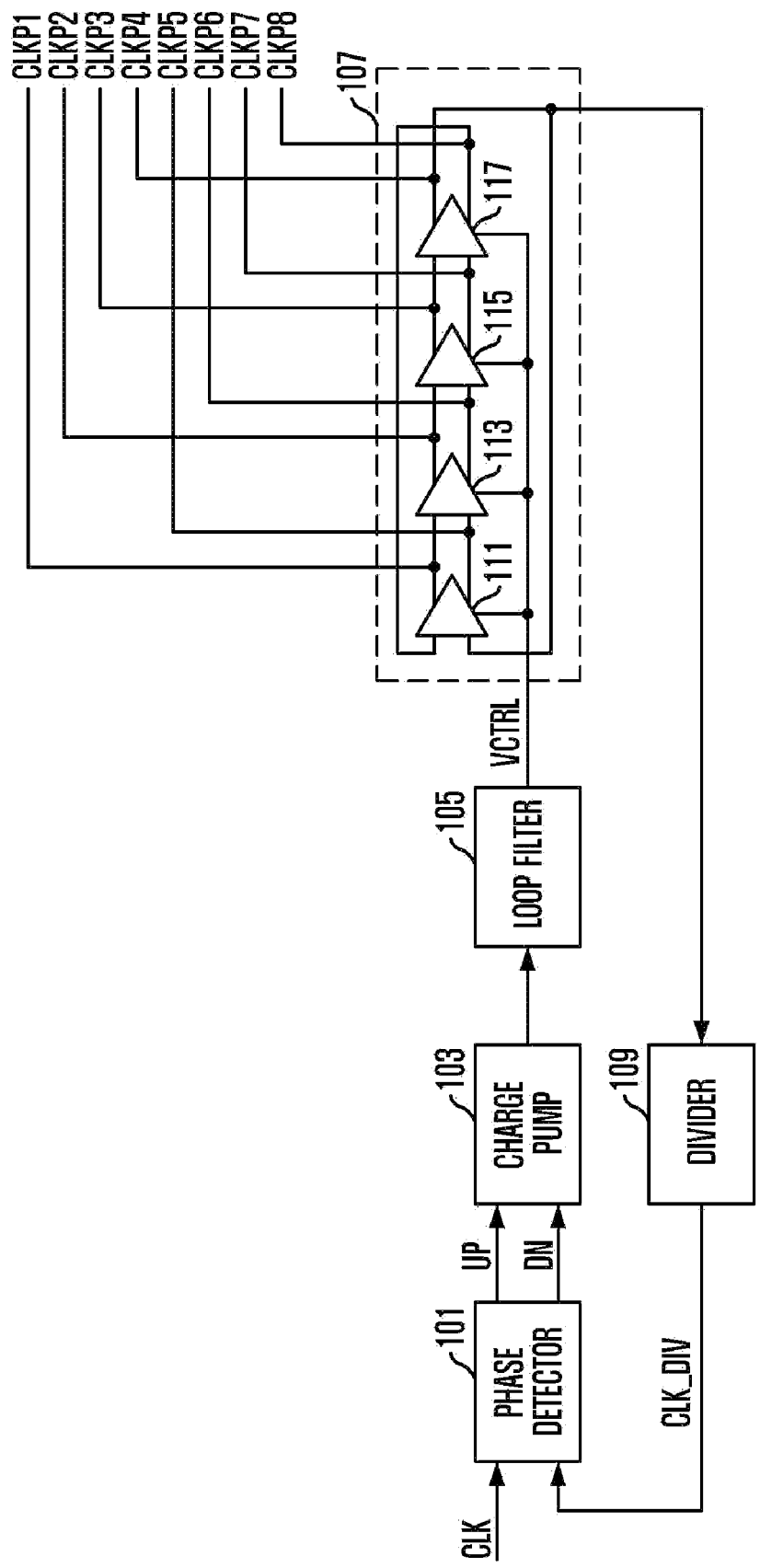
FIG. 1 illustrates a typical phase locked loop circuit which generates multi-phase clocks.

According to the related art, the multi-phase clocks are generated based on the delay amount of the delay cells 111, 113, 115, and 117 illustrated in FIG. 1. Therefore, the delay amounts of the delay cells 111, 113, 115, and 117 must be equal to one another in order to generate the multi-phase clocks having the constant phase difference. However, in accordance with the embodiment of the present invention, the multi-phase clocks CLKP_1 to CLKP_M having the constant phase difference are generated based on the pulse signals P_1 to P_8 aligned at the edges of the reference clock CLK, and the phase difference of the multi-phase clocks CLKP_1 to CLKP_M has no relation to the delay amount.

The multi-phase clock generator 203 generates the multi-phase clocks CLKP_1 to CLKP_M which are enabled or disabled in response to a plurality of pulse signal pairs. Therefore, the phase difference of the multi-phase clocks CLKP_1 to CLKP_M is a phase difference of the pulse signal pairs. The multi-phase clock generator 203 generates the multi-phase clocks CLKP_1 to CLKP_M, based on all or some of the pulse signals P_1 to P_N. Since the phase differences of the multi-phase clocks CLKP_1 to CLKP_M are all equal to one another, the pulse signal pairs may be determined so that the phase differences of the multi-phase clocks CLKP_1 to CLKP_M are all equal to one another.

Hereinafter, the second phase difference and the phase differences of the pulse signal pairs will be described.

For example, when the phase difference of the six pulse signals P_1 to P_N generated by the pulse generator 201, that is, the first phase difference, is 60 degrees and the second phase difference is defined as a phase difference between the first pulse signal P_1 and the fourth pulse signal P_4, the multi-phase clock generator 203 can generate the multi-phase clocks CLKP_1 to CLKP_6 by using all the six pulse signals P_1 to P_6. In this case, three pulse signal pairs are generated. Since the phase difference of the three pulse signal pairs is 60 degrees, the phase difference of the multi-phase clocks CLKP_1 to CLKP_6 is 60 degrees.

However, when the phase difference of the eight pulse signals P_1 to P_8 generated by the pulse generator 201, that is, the first phase difference, is 45 degrees and the second phase difference is defined as a phase difference between the first pulse signal P_1 and the fifth pulse signal P_5, the multi-phase clock generator 203 can generate the multi-phase clocks CLKP_1 to CLKP_8 by using all of the eight pulse signals P_1 to P_8, or generate the multi-phase clocks CLKP_1, CLKP_3, CLKP_5, and CLKP_7 by using the four pulse signals P_1, P_3, P_5, and P_7.

When all of the eight pulse signals P_1 to P_8 are used, four pulse signal pairs are generated. Since the phase difference of the four pulse signal pairs is 45 degrees, the phase difference of the multi-phase clocks CLKP_1 to CLKP_8 is 45 degrees. However, when only the four pulse signals P_1, P_3, P_5, and P_7 are used, two pulse signal pairs are generated. The phase difference of the two pulse signal pairs is 90 degrees which is two times larger than the case where eight pulse signals P_1 to P_8 are used. Therefore, the phase difference of the multi-phase clocks CLKP_1, CLKP_3, CLKP_5, and CLKP_7 is 90 degrees.

That is, the phase difference of the multi-phase clocks CLKP_1 to CLKP_M is determined by the second phase difference, that is, the phase difference of the pulse signal pairs.

Meanwhile, the pulse width of the multi-phase clocks CLKP_1 to CLKP_M is determined by the second phase difference. Even when the multi-phase clocks CLKP_1 to CLKP_M are not generated by using all of the pulse signals P_1 to P_N, the second phase difference is equal to that of the case where the multi-phase clocks CLKP_1 to CLKP_M are generated by using all of the pulse signals P_1 to P_N. Thus, the pulse widths of the multi-phase clocks CLKP_1 to CLKP_M are equal to one another.

In summary, the pulse generator 201 generates the plurality of pulse signals P_1 to P_N aligned at the edges of the reference clock CLK. The plurality of pulse signals P_1 to P_N have the same period and the phase difference between the adjacent pulse signals is the first phase difference. The multi-phase clock generator 203 generates the multi-phase clocks CLKP_1 to CLKP_M by using the pulse signal pairs having the second phase difference among the plurality of pulse signals P_1 to P_N. The phase difference of the multi-phase clocks CLKP_1 to CLKP_M is determined by the phase difference of the pulse signal pairs having the second phase difference, and the pulse width of the multi-phase clocks CLKP_1 to CLKP_M is determined by the second phase difference.

As described above, the clock generating circuit in accordance with the embodiment of the present invention can generate the multi-phase clocks CLKP_1 to CLKP_M by using the plurality of pulse signals P_1 to P_N aligned with the reference clock CLK. That is, since the clock generator in accordance with the embodiment of the present invention does not use the delay amount, it is possible to solve the problem that the phase difference of the multi-phase clocks CLKP_1 to CLKP_M is changed due to the delay amount of the voltage controlled oscillator 107. In addition, the layout area and the power consumption can be reduced, because the multi-phase clocks CLKP_1 to CLKP_M is generated without using the phase locked loop occupying a large layout area.

Figure 3:
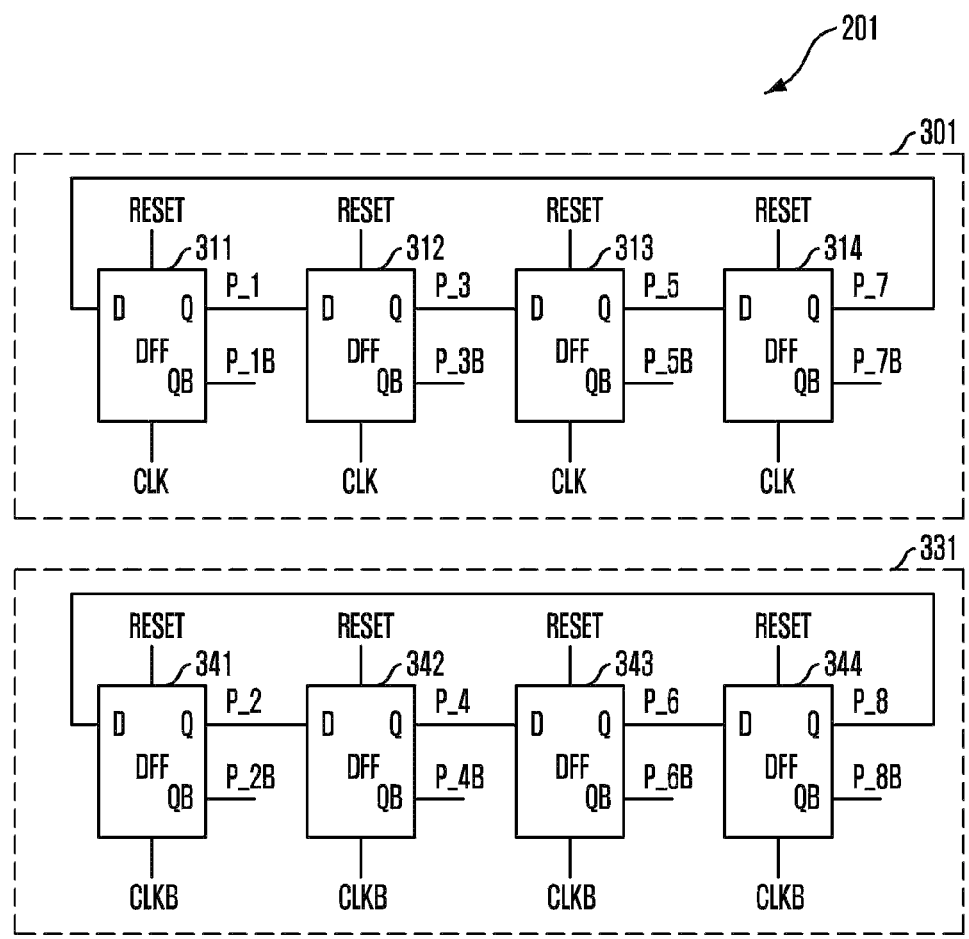
FIG. 3 is a circuit diagram of a pulse generator of FIG. 2, which generates eight pulse signals.

FIG. 3 is a circuit diagram of the pulse generator 201 generating eight pulse signals in accordance with an embodiment of the present invention.

Referring to FIG. 3, the pulse generator 201 includes a first delay unit 301 outputting four pulse signals P_1, P_3, P_5 and P_7 which are enabled at first edges of the reference clock CLK. The pulse generator 201 may further include a second delay unit 331 outputting four pulse signals P_2, P_4, P_6 and P_8 which are enabled at second edges of the reference clock CLK.

One of the first edge and the second edge of the reference clock CLK is a rising edge and the other is a falling edge. In the example of FIG. 3, the first edge is the rising edge and the second edge is the falling edge.

If the pulse generator 201 includes only the first delay unit 301 generating the four pulse signals, the first phase difference is 90 degrees; and if the pulse generator 201 further includes the second delay unit 331 generating the four pulse signals, the first phase difference is 45 degrees. The case where the pulse generator 201 includes both of the first delay unit 301 and the second delay unit 331 will be described below with reference to the accompanying drawings.

The first delay unit 301 includes a plurality of delay elements 311 to 314 having a ring-oscillator structure, and the second delay unit 331 includes a plurality of delay elements 341 to 344 having a ring-oscillator structure. To be specific, the plurality of delay elements 311 to 314 are connected in cascade, and an output signal of the final delay element 314 is inputted to the first delay element 311. The output signals of the rest delay elements are inputted to their next delay elements, respectively. Likewise, the plurality of delay elements 341 to 344 are connected in cascade, and an output signal of the final delay element 344 is inputted to the first delay element 341. The output signals of the rest delay elements are inputted to their next delay elements, respectively.

Accordingly, the plurality of delay elements 311 to 314, and 341 to 344 have an initial level in an initial operation. In order to enable the pulse generator 201 to generate the pulse signals, one of the first delay elements 311 to 314 of the first delay unit 301 and one of the second delay elements 341 to 344 of the second delay unit 331 have an initial level corresponding to an inverted initial level of the rest of the delay elements. In the example of FIG. 3, only the final delay elements 314 and 344 among the first delay elements 311 to 314 and the second delay elements 341 to 344 have a level as high as the initial level SET, and the rest delay elements have a level as low as an initial level RESET.

As the delay elements, flip-flops 311 to 314, 341 to 344 are exemplarily illustrated in FIG. 3.

In the first delay unit 301, the flip-flops 311 to 314 latch an input value at rising edges of the reference clock CLK and hold the latched input value until the next falling edge of the reference clock CLK. For example, the high-level initial level SET of the last flip-flop 314 is inputted to the first flip-flop 311 at the first rising edge of the reference clock CLK, and the first flip-flop 311 latches the high level at the first rising edge of the reference clock CLK and outputs the latched high level to the second flip-flop 312. The second flip-flop 313 latches the high level at the second rising edge of the reference clock CLK and outputs the latched high level.

In this manner, the first delay unit 301 has the 90-degree phase difference as the first phase difference and outputs four pulse signals P_1, P_3, P_5, and P_7 having four times the period of the reference clock CLK.

The flip-flops 341 to 344 of the second delay unit 331 output the plurality of pulse signals P_2, P_4, P_6, and P_8 in response to the falling edges of the reference clock CLK. That is, the flip-flops 341 to 344 latch an input value at the rising edges of the inverted reference clock CLKB. The second delay unit 331 has the 90-degree phase difference as the first phase difference through the same principle as the operation of the first delay unit 301 and outputs the four pulse signals P_2, P_4, P_6, and P_8 having four times the period of the reference clock CLK.

As described above, the plurality of pulse signals P_1, P_3, P_5, and P_7 outputted from the first delay unit 301 are enabled to the high level at the rising edges of the reference clock CLK, and the plurality of pulse signals P_2, P_4, P_6, and P_8 outputted from the second delay unit 331 are enabled at the falling edges of the reference clock CLK. Therefore, the pulse generator 201 has the first phase difference of 45 degrees at equal intervals and outputs eight pulse signals having four times the period of the reference clock CLK.

As more delay elements are employed, more pulse signals are generated. When either the first delay unit 301 or the second delay unit 331 is employed, the pulse generator 201 generates the pulse signals having a first phase difference twice as large as in the case where both the first delay unit 301 and the second delay unit 331 are employed.

At the same time, the flip-flops 311 to 314 and the flip-flops 341 to 344 generate eight inverted pulse signals P_1B to P_8B to be used in the multi-phase clock generator 203 which will be described later.

Figure 4:
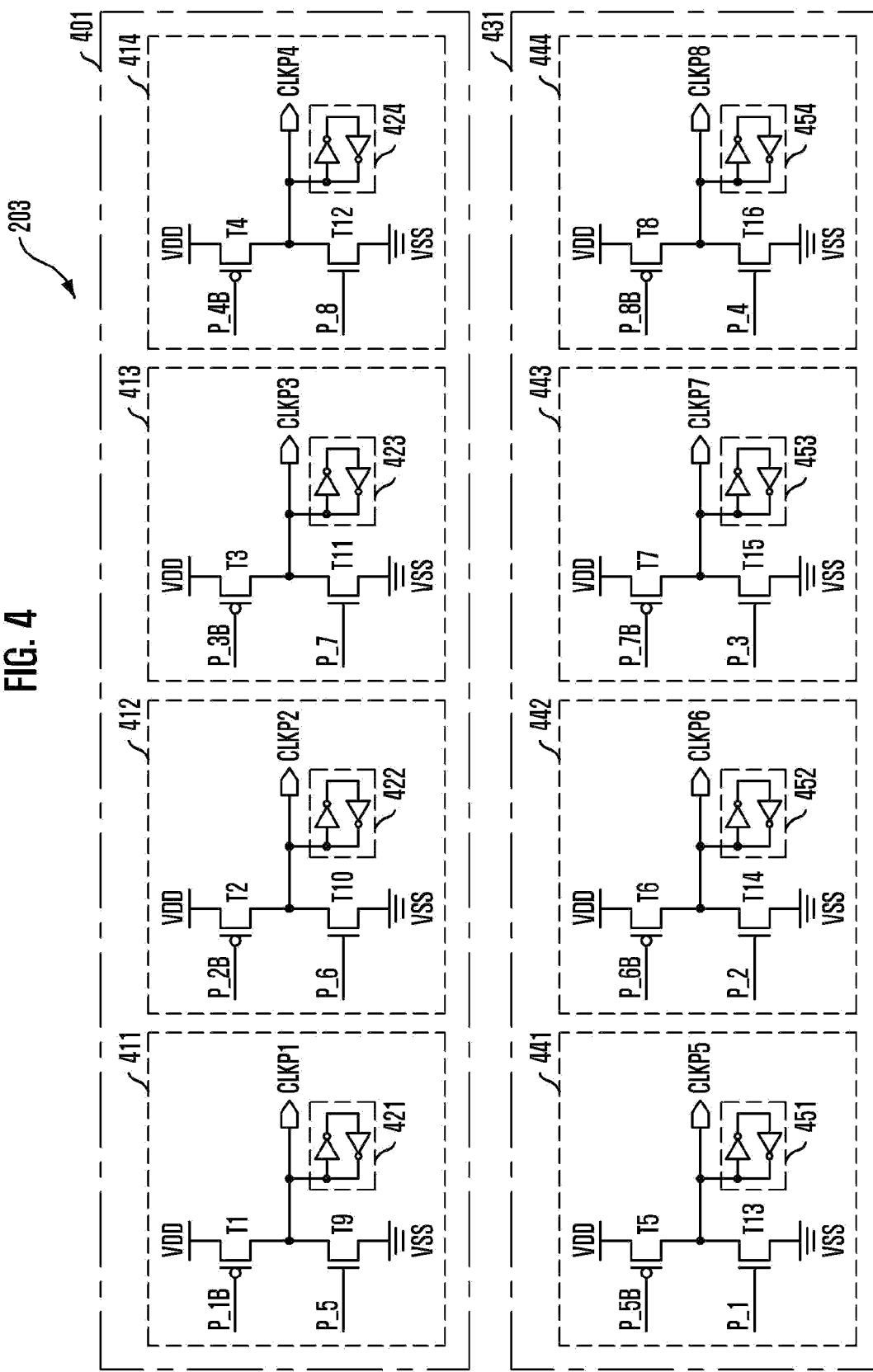
FIG. 4 is a circuit diagram of a multi-phase clock generator of FIG. 2.

FIG. 4 is a circuit diagram of the multi-phase clock generator 203 of FIG. 2.

Referring to FIG. 4, the multi-phase clock generator 203 includes a first clock generating unit 401 and a second clock generating unit 431. The first clock generating unit 401 includes a plurality of unit-phase clock generating units 411 to 414 generating first clocks CLKP_1 to CLKP_4 which are enabled in response to inverted lead pulse signals P_1B to P_4B among the plurality of pulse signal pairs having the second phase difference and are disabled in response to lag pulse signals P_5 to P_8 having the second phase difference from the lead pulse signals P_1 to P_4. The second clock generating unit 431 includes a plurality of unit-phase clock generating units 441 to 444 generating second clocks CLKP5 to CLKP_8 which are enabled in response to the inverted lag pulse signals P_5B to P_8B and are disabled in response to the lead pulse signals P_1 to P_4.

The lead pulse signals refer to pulse signals having the leading phase among the pulse signal pairs, and the lag pulse signals refer to pulse signals having the second phase difference from the lead pulse signals.

The unit-phase clock generating units 411 to 414 of the first clock generating unit 401 include pull-up transistors T1 to T4, pull-down transistors T9 to T12, and storing units 421 to 424, respectively. The unit-phase clock generating units 441 to 444 of the second clock generating unit 431 include pull-up transistors T5 to T8, pull-down transistors T13 to T16, and storing units 451 to 454, respectively. The storing units 421 to 424 hold the logic levels of the first clocks CLKP_1 to CLKP_4, and the storing units 451 to 454 hold the logic levels of the second clocks CLKP_5 to CLKP_8.

In the unit-phase clock generating units 411 to 414 of the first clock generating unit 401, the pull-up transistors T1 to T4 are connected in series to the pull-down transistors T9 to T12, respectively. The pull-up transistors T1 to T4 are turned on by the inverted lead pulse signals P_1B to P_4B. The pull-down transistors T9 to T12 are turned on by the lag pulse signals P_5 to P_8. The storing units 421 to 424 are respectively connected to the output terminals of the pull-up transistors T1 to T4 and the pull-down transistors T9 and T12, and hold the logic levels of the first clocks CLKP_1 to CLKP_4 at a time period between the turn-on time point of the pull-up transistors T1 to T4 and the turn-on time point of the pull-down transistors T9 to T12.

In the unit-phase clock generating units 441 to 444 of the second clock generating unit 431, the pull-up transistors T5 to T8 are connected in series to the pull-down transistors T13 to T116, respectively. The pull-up transistors T5 to T8 are turned on by the inverted lag pulse signals P_5B to P_8B. The pull-down transistors T13 to T16 are turned on by the lead pulse signals P_1 to P_4. The storing units 451 to 454 have the same structure as the storing units 421 to 424 of the unit-phase clock generating units 411 to 414.

In the example of FIG. 4, the multi-phase clock generator 203 generates eight multi-phase clocks CLKP_1 to CLKP_8, based on four pulse signal pairs composed of eight pulse signals P_1 to P_8 generated by the pulse generator 201. Since the four pulse signal pairs are used, the first clock generating unit 401 includes four unit-phase clock generating units 411 to 414, and the second clock generating unit 431 includes four unit-phase clock generating units 441 to 444.

As another example, each of the first and second clock generating units 401 and 431 may include two unit-phase clock generating units. In this case, the multi-phase clock generator 203 can generate four multi-phase clocks by using only two pulse signal pairs among four pulse signals pairs.

The following description will be made on the case where the first and second clock generating units 401 and 431 generate the clocks using the pulse signal pairs having the second phase difference, the first pulse signal P_1 being the lead pulse signal, and the fifth pulse signal P_5 being the lag pulse signal.

In the unit-phase clock generating unit 411, the inverted first pulse signal P_1B is applied to the pull-up transistor T1. The first multi-phase clock CLKP_1 is enabled to a high level in response to a low level of the inverted first pulse signal P_1B. The storing unit 421 holds the high level of the first multi-phase clock CLKP_1 until the pull-down transistor T9 is turned on by the fifth pulse signal P_5 having the second phase difference from the inverted first pulse signal P_1B. Thereafter, the first multi-phase clock CLKP_1 is disabled to a low level in response to the high level of the fifth pulse signal P_5. The storing unit 421 holds the low level of the first multi-phase clock CLKP_1 until the pull-up transistor T1 is again turned on by the inverted first pulse signal P_1B having the second phase difference from the fifth pulse signal P_5.

In the unit-phase clock generating unit 441, the inverted fifth pulse signal P_5B is applied to the pull-up transistor T5. The fifth multi-phase clock CLKP_5 is enabled to a high level in response to a low level of the inverted fifth pulse signal P_5B. The storing unit 451 holds the high level of the fifth multi-phase clock CLKP_5 until the pull-down transistor T13 is turned on by the first pulse signal P_1 having the second phase difference from the fifth pulse signal P_5. Thereafter, the fifth multi-phase clock CLKP_5 is disabled to a low level in response to the high level of the first pulse signal P_1. The storing unit 451 holds the low level of the fifth multi-phase clock CLKP_5 until the pull-up transistor T5 is again turned on by the inverted pulse signal P_5B having the second phase difference from the first pulse signal P_1.

As described above with reference to FIG. 2, when two pulse signal pairs are used, the first clock generating unit 401 includes the unit-phase clock generating units 411 and 413 and the second clock generating unit 441 includes the unit-phase clock generating units 441 and 443. The multi-phase clock generator 203 can generate four multi-phase clocks CLKP_1, CLKP_3, CLKP_5, and CLKP_7.

Figure 5A:
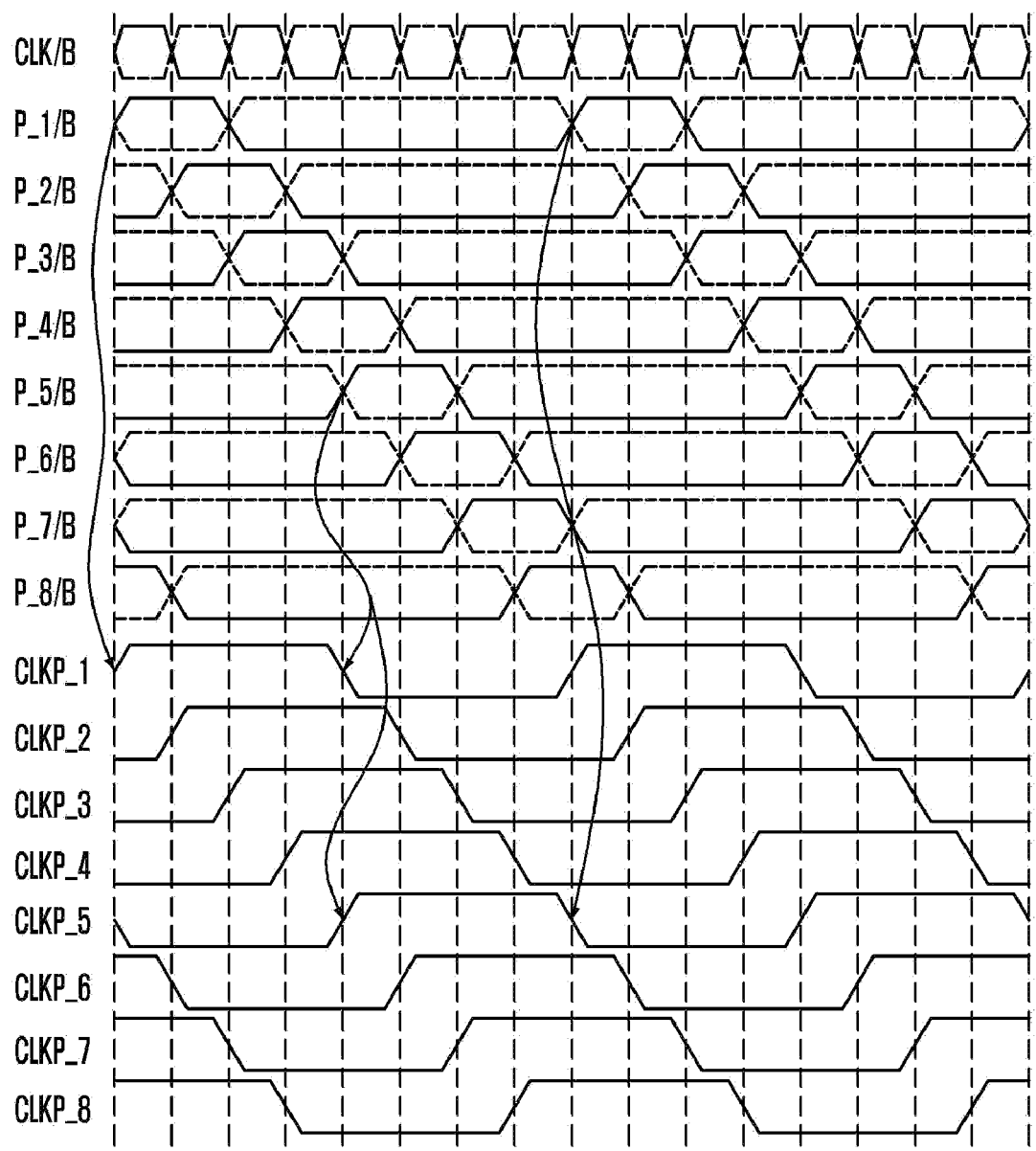
FIGS. 5A and 5B are timing diagrams illustrating the overall operation of the clock generating circuit in accordance with the embodiment of the present invention.
Figure 5B:
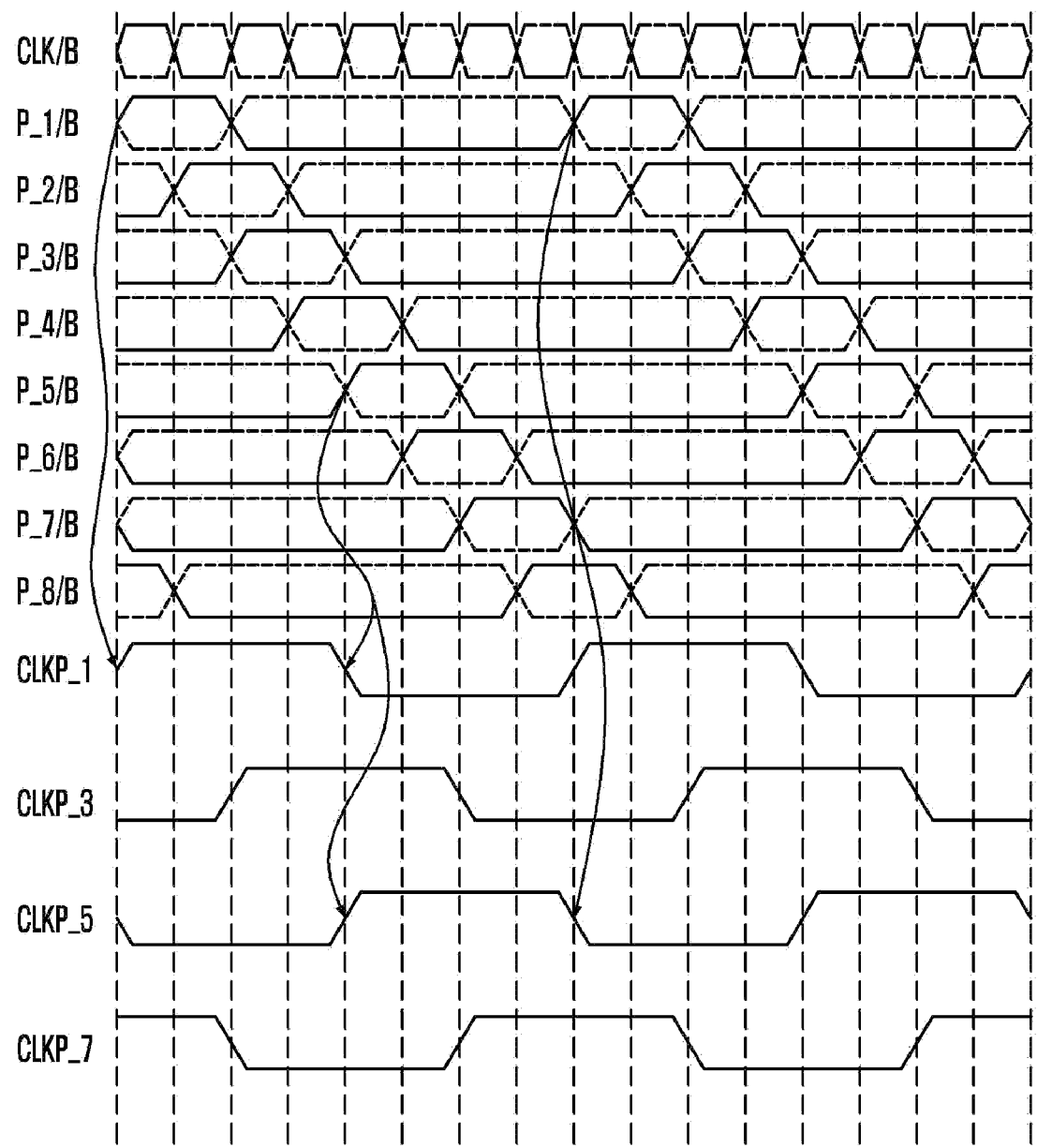

FIGS. 5A and 5B are timing diagrams illustrating the overall operation of the clock generating circuit in accordance with the embodiment of the present invention.

Specifically, FIG. 5A is a timing diagram illustrating the generation of eight multi-phase phase clocks CLKP_1 to CLKP_8, and FIG. 5B is a timing diagram illustrating the generation of four multi-phase clocks CLKP_1, CLKP_3, CLKP_5, and CLKP_7. A solid line and a dotted line represent an inversion relationship. For example, the reference clock CLK is indicated by the solid line, and the inverted reference clock CLKB is indicated by the dotted line.

In FIGS. 5A and 5B, the pulse generator 201 has the 45-degree phase difference as the first phase difference at equal intervals and generates eight pulse signals P_1 to P_8 having the same period. The rising edges of the four pulse signals P_1, P_3, P_5, and P_7 generated by the first delay unit 301 among the eight pulse signals P_1 to P_8 are synchronized with the rising edges of the reference clock CLK, and the rising edges of the four pulse signals P_2, P_4, P_6, and P_8 generated by the second delay unit 331 are synchronized with the falling edges of the reference clock CLK.

The multi-phase clock generator 203 in FIG. 5A generates the eight multi-phase clocks CLKP_1 to CLKP_8. The second phase difference is 180 degrees. The phase difference between the pulse signal pairs having the second phase difference, that is, the pair of the first pulse signal P_1 and the fifth pulse signal P_5, the pair of the second pulse signal P_2 and the sixth pulse signal P_6, the pair of the third pulse signal P_3 and the seventh pulse signal P_7, and the pair of the fourth pulse signal P_4 and the eighth pulse signal P_8, is 45 degrees. The phase difference of the eight multi-phase clocks CLKP_1 to CLKP_8 is 45 degrees, which are the phase differences between the pulse signal pairs having the second phase difference of 180 degrees and the eight pulse signals P_1 to P_8.

In the case where the multi-phase clocks CLKP_1 and CLKP_5 are generated by the first pulse signal P_1 and the fifth pulse signal P_5, the first clock generating unit 401 generates the first multi-phase clock CLKP_1 which is enabled to a high level in response to the rising edge of the first pulse signal P_1 and disabled to a low level in response to the fifth pulse signal P_5. The second clock generating unit 431 generates the fifth multi-phase clock CLKP_5 which is enabled to a high level in response to the fifth pulse signal P_5 and disabled to a low level in response to the first pulse signal P_1. The second to fourth multi-phase clocks CLKP_2 to CLKP_4 and the sixth to eighth multi-phase clocks CLKP_6 to CLKP_8 are generated by other pulse signal pairs.

The eight multi-phase clocks CLKP_1 to CLKP_8 have a pulse width corresponding to the interval between the rising edges of the pulse signal pair having the second phase difference, that is, the first pulse signal P_1 and the fifth pulse signal P_5.

Unlike in FIG. 5A, the multi-phase clock generator 203 in FIG. 5B generates four multi-phase clocks CLKP_1, CLKP_3, CLKP_5, and CLKP_7 using four pulse signals P_1, P_3, P_5, and P_7. Like the case of FIG. 5A, the second phase difference is 180 degrees. The phase difference between the pulse signal pairs among the eight pulse signals P_1 to P_8 generated by the pulse generator 201, that is, the pair of the first pulse signal P_1 and the fifth pulse signal P_5 and the pair of the third pulse signal P_3 and the seventh pulse signal P_7 is 90 degrees. The phase difference between the pulse signal pairs having the second phase difference of 180 degrees among the eight pulse signals P_1 to P_8 is 90 degrees.

In the case where the multi-phase clocks CLKP_1 and CLKP_5 are generated by the first pulse signal P_1 and the fifth pulse signal P_5, the first clock generating unit 401 generates the first multi-phase clock CLKP_1 which is enabled to a high level in response to the rising edge of the first pulse signal P_1 and disabled to a low level in response to the fifth pulse signal P_5. The second clock generating unit 431 generates the third multi-phase clock CLKP_3 which is enabled to a high level in response to the fifth pulse signal P_5 and disabled to a low level in response to the first pulse signal P_1.

The four multi-phase clocks CLKP_1, CLKP_3, CLKP_5, and CLKP_7 have the pulse width corresponding to the interval between the rising edge of the pulse signal pair having the second phase difference, that is, the first pulse signal P_1 and the fifth pulse signal P_5.

Although the above description has been made in view of the device, the operations of the respective elements constituting the clock generating circuit can be easily understood in view of process. Therefore, the stepwise operations of the respective elements constituting the clock generating method can be understood according to the principle of the present invention.

The clock generating method in accordance with an embodiment of the present invention will be described below with reference to FIGS. 2 to 5.

The clock generating method in accordance with the embodiment of the present invention includes an operation of generating pulse signals, an operation of combining pulse signals, and an operation of generating multi-phase clocks. The operation of generating pulse signals is to generate a plurality of pulse signals P_1 to P_N having the same period, based on a reference clock CLK. The phase difference between the pulse signals P_1 to P_N is a first phase difference. The operation of combining pulse signal pairs is to combine pulse signals having a second phase difference among the pulse signals P_1 to P_N into a plurality of pulse signal pairs. The operation of generating multi-phase clocks is to generate multi-phase clocks CLKP_1 to CLKP_M, based on the pulse signal pairs, wherein the phase difference between the adjacent clocks is equal to the phase difference between the pulse signal pairs.

The edges of the pulse signals P_1 to P_N are aligned at the rising or falling edges of the reference clock CLK. The pulse signals P_1 to P_N are enabled to a high level in response to the rising or falling edges of the reference clock CLK and have the same period.

In the operation of generating the multi-phase clocks, a first clock is generated, which is enabled in response to a lead pulse signal and disabled in response to a lag pulse signal having a second phase difference from the lead pulse signal. In addition, a second clock is generated, which is enabled in response to the lag pulse signal and disabled in response to the lead pulse signal. Therefore, the phase difference of the multi-phase clocks CLKP_1 to CLKP_M is equal to the phase difference between the pulse signal pairs, and the pulse width of the multi-phase clocks, which is determined by the second phase difference.

The lead pulse signal refers to a pulse signal having the leading phase among the pulse signal pairs, and the lag pulse signal refers to a pulse signal having the second phase difference from the lead pulse signal.

In the operation of generating the multi-phase clocks, the multi-phase clocks CLKP_1 to CLKP_M are generated based on all or some of the pulse signals P_1 to P_N. Since the multi-phase clocks CLKP_1 to CLKP_M have the same phase difference, the pulse signal pairs may be combined so that the multi-phase clocks CLKP_1 to CLKP_M have the same phase difference.

In accordance with the embodiments of the present invention, the circuit area and power consumption are reduced because the circuits occupying a large area, such as phase locked loop, are not used, and the multi-phase clocks have accurate phase difference, because they are generated based on the pulse signals aligned at the clock edges.

While the present invention has been described with respect to the specific embodiments, it will be apparent to those skilled in the art that various changes and modifications may be made without departing from the spirit and scope of the invention as defined in the following claims.

What is claimed is:

1. A clock generating circuit, comprising:
   a pulse generating unit configured to generate a plurality of pulse signals, based on a reference clock, the pulse signals having a same period as each other, adjacent ones of the pulse signals being separated by a first phase difference; and
   a multi-phase clock generating unit configured to generate a plurality of multi-phase clocks, adjacent clocks being separated by a second phase difference, further including a plurality of unit-phase clock generating units each receiving a pulse signal pair constituted by a pair of pulse signals separated from each other by the second phase difference.

2. The clock generating circuit of claim 1, wherein edges of the plurality of pulse signals are aligned with edges of the reference clock.

3. The clock generating circuit of claim 1, wherein the pulse generating unit comprises a first delay unit configured to output the plurality of pulse signals, which are enabled at first edges of the reference clock.

4. The clock generating circuit of claim 3, wherein the first delay unit comprises a plurality of first delay elements arranged to form a ring-oscillator structure.

5. The clock generating circuit of claim 4, wherein a first initial value of any one of the first delay elements is inverted relative to a second initial value of all other ones of the first delay elements.

6. The clock generating circuit of claim 3, wherein the pulse generating unit further comprises a second delay unit configured to output a plurality of pulse signals which are enabled at second edges of the reference clock, the second delay unit comprising a plurality of second delay elements connected in a ring-oscillator structure.

7. The clock generating circuit of claim 6, wherein a first initial value of any one of the first delay elements is inverted relative to a second initial value of all other ones of the first delay elements.

8. The clock generating circuit of claim 1, wherein the multi-phase clock generating unit comprises:
   a first clock generating unit comprising a first plurality of unit-phase clock generating units configured to generate first clocks which are enabled in response to lead pulse signals among the plurality of pulse signal pairs and are disabled in response to lag pulse signals having the second phase difference from the lead pulse signals; and a second clock generating unit comprising a second plurality of unit-phase clock generating units configured to generate second clocks which are enabled in response to the lag pulse signals and are disabled in response to the lead pulse signals.

9. The clock generating circuit of claim 8, wherein each unit-phase clock generating unit comprises:
   a pull-up transistor;
   a pull-down transistor; and
   a storage unit configured to hold logic levels of the first and second clocks.

10. The clock generating circuit of claim 1, wherein a pulse width of the multi-phase clocks is determined by the second phase difference.

11. A clock generating circuit, comprising:
   a pulse generating unit configured to generate a plurality of pulse signals which are enabled in response to edges of a reference clock and are separated by a first phase difference at equal intervals; and
   a multi-phase clock generating unit configured to generate a first multi-phase clock, which is enabled in response to a pulse signal having a leading phase in a plurality of pulse signal pairs, each pulse signal pair constituted by a pair of pulse signals separated from each other by a second phase difference, and is disabled in response to a pulse signal having a lagging phase, and a second multi-phase clock, which is enabled in response to the pulse signal having the lagging phase and is disabled in response to the pulse signal having the leading phase.

12. The clock generating circuit of claim 11, wherein the pulse generating unit comprises a plurality of delay elements arranged to form a ring-oscillator structure.

13. The clock generating circuit of claim 12, wherein a first initial value of any one of the first delay elements is inverted relative to a second initial value of all other ones of the first delay elements.

14. The clock generating circuit of claim 11, wherein the first multi-phase clock and the second multi-phase clock are separated by the second phase difference.

15. The clock generating circuit of claim 11, wherein the multi-phase clock generating unit comprises:
   a pull-up transistor;
   a pull-down transistor; and
   a storage unit configured to hold logic levels of the first and second multi-phase clocks.

16. A clock generating method, comprising:
   generating a plurality of pulse signals based on a reference clock, the pulse signals having a same period, adjacent ones of the plurality of pulse signals being separated by a first phase difference;
   combining ones of the pulse signals having a second phase difference therebetween into pulse signal pairs; and
   generating a plurality of multi-phase clocks, adjacent multi-phase clocks being separated by the second phase difference, based on the pulse signal pairs.

17. The clock generating method of claim 16, wherein edges of the pulse signals are aligned at edges of the reference clock.

18. The clock generating method of claim 16, wherein generating the plurality of multi-phase clocks comprises:
   generating a first multi-phase clock that is enabled in response to a lead pulse signal in the plurality of pulse signal pairs and is disabled in response to a lag pulse signal having the second phase difference from the lead pulse signal; and
   generating a second multi-phase clock which is enabled in response to the lag pulse signal and is disabled in response to the lead pulse signal.

19. The clock generating method of claim 16, wherein a pulse width of the multi-phase clocks is determined by the second phase difference.

* * * * *

UNITED STATES PATENT AND TRADEMARK OFFICE
CERTIFICATE OF CORRECTION

PATENT NO. : 7,760,002 B2  Page 1 of 1
APPLICATION NO. : 12/325346
DATED : July 20, 2010
INVENTOR(S) : Dae-Han Kwon et al.

It is certified that error appears in the above-identified patent and that said Letters Patent is hereby corrected as shown below:

Title page change FOREIGN PATENT DOCUMENTS item (56) for References Cited as follows:

FOREIGN PATENT DOCUMENTS
 JP   2001-318731      11/2001
 KR  1020000077451 A   12/2000
 KR  1020040026649 A   3/2004
 KR  1020040034985 A   4/2004

Signed and Sealed this

Thirty-first Day of August, 2010

David J. Kappos
*Director of the United States Patent and Trademark Office*